May 26, 1959  E. T. PLATZ  2,888,529
INTERLOCK MEANS FOR BUS DUCT PLUG-IN UNITS
Filed Sept. 12, 1957  3 Sheets-Sheet 1
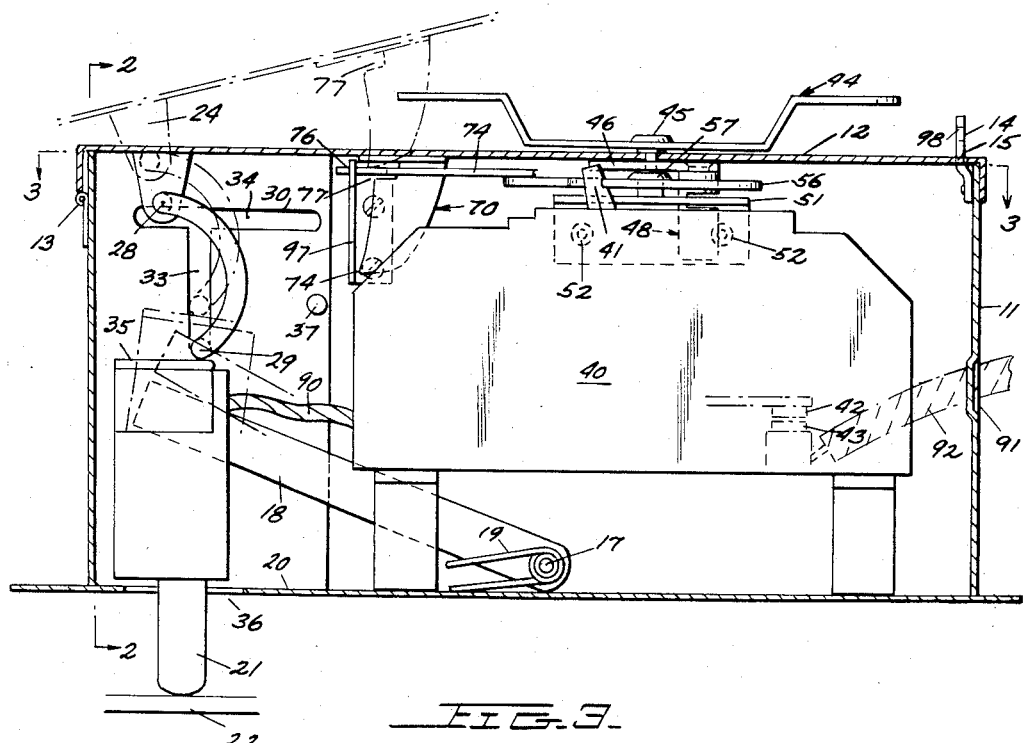
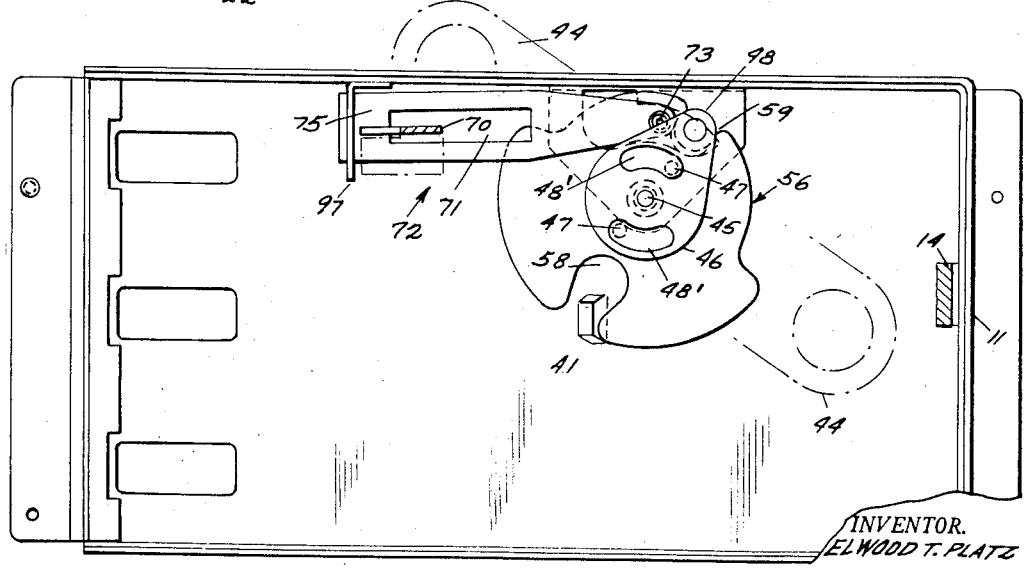
INVENTOR.
ELWOOD T. PLATZ
BY
ATTORNEYS May 26, 1959
E. T. PLATZ
2,888,529
INTERLOCK MEANS FOR BUS DUCT PLUG-IN UNITS
Filed Sept. 12, 1957
3 Sheets-Sheet 2
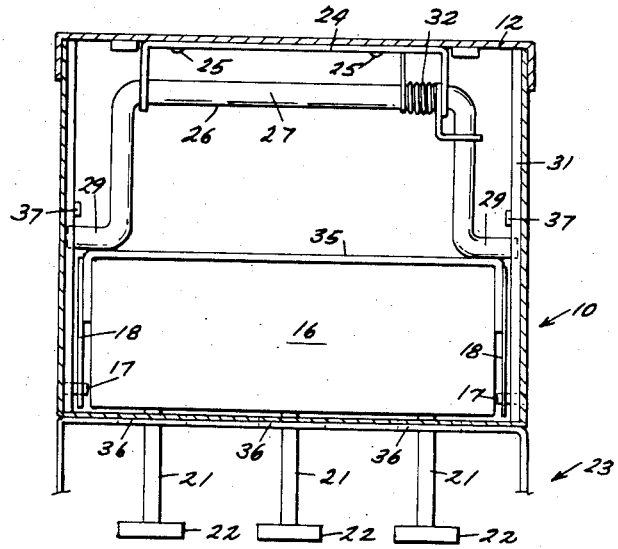
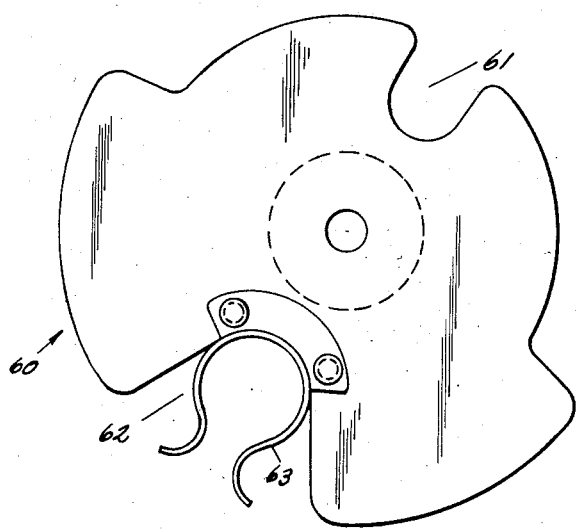
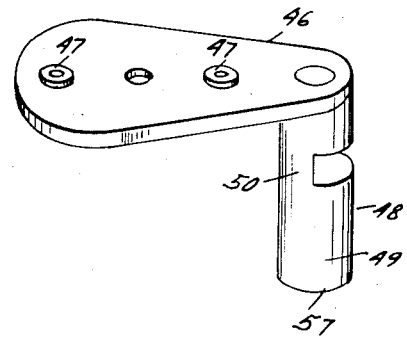
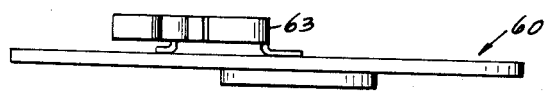
INVENTOR.
ELWOOD T. PLATZ
BY
ATTORNEYS May 26, 1959 E. T. PLATZ 2,888,529
INTERLOCK MEANS FOR BUS DUCT PLUG-IN UNITS
Filed Sept. 12, 1957 3 Sheets-Sheet 3

INVENTOR.
ELWOOD T. PLATZ
BY
ATTORNEYS

United States Patent Office 2,888,529
Patented May 26, 1959

2,888,529

INTERLOCK MEANS FOR BUS DUCT PLUG-IN UNITS

Elwood T. Platz, Detroit, Mich., assignor, by mesne assignments, to I-T-E Circuit Breaker Company, Philadelphia, Pa., a corporation of Pennsylvania Application September 12, 1957, Serial No. 683,642

14 Claims. (Cl. 200—50)

This invention relates to plug-in units for bus duct electric distribution systems and more particularly to plug-in units having cover operated conducting fingers wherein the conducting fingers are prevented from being brought into engagement with the bus bars when the load switch is On by the provision of an interlock which prevents closing of the cover at such time.

A plug-in unit is used to tap electrical power from the bus bars of a bus duct electric distribution system and to transmit this power by way of a cable to a load. The plug-in unit comprises a case wherein a load switch is positioned and a plurality of conducting fingers that are movable into and out of the case to contact the bus bars.

In plug-in units of the prior art having cover operated conducting fingers, such as disclosed in copending application Serial No. 637,575, filed January 13, 1957, and assigned to the assignee of the instant invention, the load switch located within the plug-in unit housing may be operated for test purposes even when the case cover is opened. If the load switch is left On and thereafter the cover is closed arcing will occur between the conducting fingers and the bus bars. But the contact points between the bus bars and the conducting fingers are not designed to interrupt current. Hence, an interlock means is required to prevent engagement and disengagement of the conducting fingers and bus bars while the load switch is On.

Such an interlock comprises a projecting member secured to the case cover and a blocking member operatively connected to the operating handle of the load switch. When the load switch is On, the blocking member is positioned in the path of the projecting member as the cover is being moved toward its closed position thus preventing closing of the cover. However, when the load switch is Off, the blocking member no longer interferes with movement of the cover and it may be closed.

A further problem exists when closing the cover of a plug-in unit which problem is also common to enclosures having circuit interrupter devices mounted therein, that is, a control handle for the enclosed device is frequently mounted on the outside of the enclosure cover. When the cover is opened the externally operated mechanism on the inside of the cover is completely disengaged from the operating handle of the circuit interrupting device. Upon closing the cover the externally operated cover mounted mechanism does not automatically re-engage the operating handle of the device because either of these handles may be in an indeterminate On or Off position and thereby cause an unmating relationship to occur.

The relatively weak operating handle is often broken when the cover is closed under conditions of unmating. This is especially so with hinged covers which are usually slammed shut.

To alleviate this condition, my invention provides an operator which is in operative engagement with the operating handle and is also pivotally mounted to a fixed member within the enclosure. A cover mounted mechanism is received by an opening in the operator only at such time as the control handle and operating handles are in their respective Off positions. Should their positions be other than Off the impact of the closing cover will be absorbed by the relatively strong operator and fixed member rather than by the weak operating handle of the circuit interrupting device.

Still another problem exists in that the operating handle of the circuit interrupter is often broken by the application of excessive force to the external control handle. Stops are not practical because of tolerance accumulations in the multitude of component parts involved. To remedy this situation, a resilient connection is provided between the control handle and the interrupter operating handle.

Accordingly, a primary object of this invention is to provide a plug-in unit wherein the cover thereof cannot be closed while the load switch is On.

Another object is to provide a plug-in unit wherein the cover thereof cannot be operated while the load switch is On.

Still another object is to provide a plug-in unit wherein the load switch operating handle cannot be broken if the cover is shut while the external control handle is not in a position corresponding to the position of the operating handle.

A further object is to provide a plug-in unit wherein the cover cannot be closed unless the external control handle is in the Off position.

A still further object is to provide a plug-in unit wherein the cover cannot be opened while the load switch is On.

Another object is to provide a resilient driving connection between the external control handle of the enclosure and the operating handle of the circuit interrupter mounted therein.

Yet another object is to provide a plug-in unit wherein the conducting fingers thereof may not make or break contact with the bus bars of a bus duct while the load switch is On.

These and other objects of this invention will become more apparent after reading the following description and studying the accompanying drawings in which:

Figure 1 is a side elevation of a plug-in unit with the conducting fingers projected and the load switch On.

Figure 2 is a section through line 2—2 of Figure 1 looking in the direction of arrows 2—2.

Figure 3 is a plan view of a plug-in unit with the cover closed.

Figure 6 is a plan view of an operator including resilient means.

Figure 6A is an end view of the operator of Figure 6.

Figure 7 is a perspective view of the projecting member and the plate from which it extends.

Figure 4:
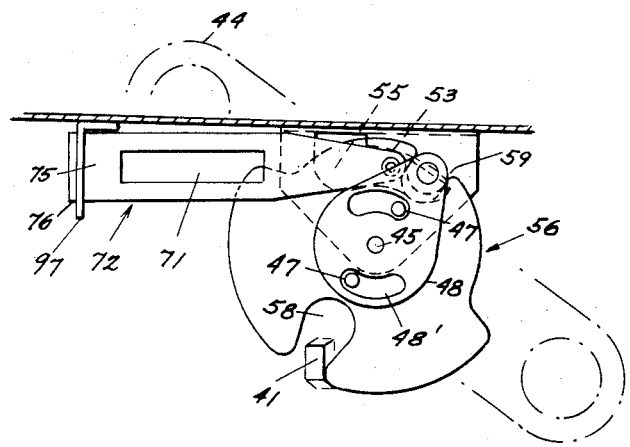
Figure 4 is a fragmentary plan view of a plug-in unit with the cover removed, the circuit breaker On and the conducting fingers retracted.
Figure 5:
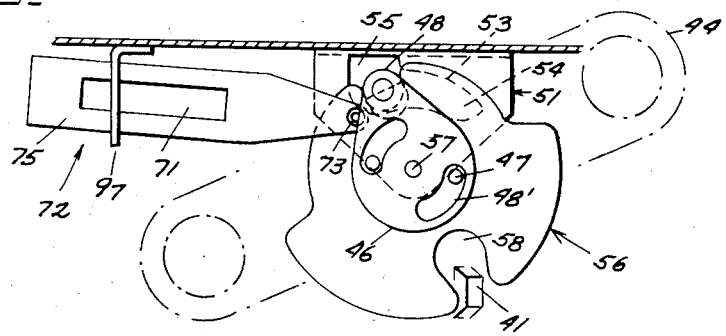
Figure 5 is a fragmentary plan view of a plug-in unit with the cover removed, the circuit breaker Off and the conducting fingers retracted.

Referring to the figures, the plug-in unit 10 comprises a case 11 having a cover 12 pivotally mounted at hinges 13. A tab 14 secured to case 11 mates with cover opening 15 to prevent the cover 12 from accidentally flying open. Contact structure 16 is disposed within the case 11 and is pivotally mounted thereto at posts 17 by means of extensions 18 with torsion springs 19 being positioned on each post 17 to engage the bottom 20 of the case 11 and the extensions 18 to bias the contact structure 16 clockwise with respect to Figure 1. The contact structure 16 includes three conducting fingers 21 which are used to engage bus bars 22 of the plug-in bus duct 23, which may be of the type more fully disclosed in U.S. Patent No. 2,343,232, issued February 29, 1944, entitled "Adjustable Connector for Electrical Distribution Systems" to Alva A. Togesen and U.S. Patent No. 2,287,502, issued June 23, 1942, entitled "Electrical Distribution System" to Alva A. Togesen and Lawrence E. Fisher assigned to the assignee of the instant invention.

A cover bracket 24 is secured to the cover 12 by fasteners 25. The central portion 27 of bale 26 is positioned within openings 28 of cover bracket 24 and the turned out ends 29 of bale 26 are operatively positioned within T slots 30 of guide plates 31 so as to be guided thereby. Torsion spring 32 is wound around the central portion 27 of bale 26 with one end of spring 32 engaging the cover 12 and the other end engaging the bale 26 to bias the bale 26 clockwise about cover bracket 24 as seen in Figures 1 and 2.

With the cover 12 in its closed position, the turned out ends 29 are journalled at the bottom of the vertical section 33 of the T-slot 30. When the cover 12 is fully opened, the turned out ends 29 will rest in the left hand end of the horizontal portion 34 of the T-slot 30. Upon opening and closing of the cover 12, the turned out ends 29 will normally move between the left end of horizontal section 34 and the bottom of vertical section 33, with torsion spring 32 providing clockwise bias to urge the turned out ends 29 into the vertical section 33 rather than permitting the turned out ends 29 to proceed to the right end of the horizontal section 34. The turned out ends 29 rest against the top 35 of contact structure 16. Since the contact structure 16 is biased upward, the contact structure 16 will assume a position dictated by turned out ends 29. Thus, when the cover is closed, the contact structure 16 will be in a lowered position with the conducting fingers 21 being projected through opening 36 in the bottom 20 of case 11 to engage bus bars 22. In a like manner when the cover is opened, the contact structure 16 will be biased upward and the conducting fingers 21 will be positioned within the confines of case 11. Stops 37 project inwardly from guide plates 31 to engage extensions 18 and thereby limit the upward travel of contact structure 16.

When the plug-in unit 10 is to be stored or shipped, it is desirable to have the conducting fingers 21 positioned within the confines of case 11 when the cover 12 thereof is closed. In order to accomplish this, a counterclockwise manual force must be applied to bale 26 to overcome the clockwise force of the torsion spring 32 until the turned out ends 29, riding from left to right in the horizontal section 34, have passed the vertical section 33 so that upon continued movement of the cover 12 to its closed position, the turned out ends 29 will now rest in the right hand end of the horizontal section 34 of T-slot 30. Closing of cover 12 with the conducting fingers 21 within the confines of case 11 may also be desirable when work is being done on a load (not shown). At this time the cover may be locked by placing the hasp of a lock (not shown) into hole 98 of tab 14 thereby preventing unauthorized persons from energizing the plug-in unit 10.

A load switch 40 having an operating handle 41 is disposed in a fixed position within case 11. The load switch 40 may be a circuit breaker of the type disclosed in Patent No. 2,678,359, assigned to the I-T-E Circuit Breaker Company, wherein the operating handle 41 is operatively connected to cooperating contacts 42 and 43 to interrupt the circuit between the load and the conducting fingers 21. The line terminals (not shown) of circuit breaker 40 are electrically connected to the conducting fingers 21 by means of cable 90 and the load terminals (not shown) of circuit breaker 40, to which stationary contacts 43 are mounted, are electrically connected to a load by cable 92 which extends through knockout opening 91 in the end of case 11.

A control handle 44 is pivotally mounted to the outside of cover 12 at pin 45. A plate 46 positioned on the inside of cover 12 is secured to control handle 44 by means of screws 47, the heads of which ride in arcuate slots 48' cut in cover 12 so that the plate 46 and control handle 44 have limited rotational movement. A projection 48, the operation of which will be hereinafter explained, projects downwardly from plate 46 with projection 48 comprising a body 49 having a reduced section 50 intermediate the two ends thereof.

A breaker actuator bracket 51 is secured to the inside of the case 11 near the top thereof by means of fasteners 52. Breaker actuator bracket 51 includes a two width slot 53 having a first slot section 54 and a second slot section 55 which is wider than the first slot section 54. An operator 56 is pivotally mounted to breaker actuator bracket 51 at pin 57. The operator 56 includes a first opening 58 in which the operating handle 41 of load switch 40 is nested, and second opening 59 positioned in alignment with the two width slot 53 of breaker actuator bracket 51.

When the cover 12 is closed, the narrow portion 50 of the projection 48 will ride in the two width slot 53 of bracket 51 with the body 49 being positioned within opening 59 of the operator so that as control handle 44 is rotated the operating handle 41 will be moved.

Load switch 40 is provided with a pair of cooperating contacts 42, 43 for each of the conducting fingers 21 with contacts 42 and 43 being operable by the operating handle 41. When the control handle 44 is in its most counterclockwise or Off position, the operating handle 41 is in its right most position with respect to Figure 1 wherein the cooperating contacts 42 and 43 are disengaged. When control handle 44 is in its most clockwise or On position, the operating handle 41 is in its left most position thereby operating the cooperating contacts 42 and 43 into engagement. The reduced section 50 of projection 48 is positioned within the second slot section 55 only when the control handle 44 is in the Off position. At all other positions of the control handle 44, the reduced section 50 is positioned within the first or narrow slot section 54 which is narrower than the width of body 49 thereby preventing the opening of cover 12 unless the control handle is in the Off position. If an attempt is made to close cover 12 when the control handle 44 is at any position except Off, the end 57 of projection 48 will strike the operator 56 unless opening 59 of operator 56 is in position to receive body 49. However, if opening 59 is in position to receive body 49 and breaker 40 is not Off, end 57 will pass through opening 59 and strike breaker actuator bracket 51. Thus the impact of closing when the position of control handle 44 and the position of operating handle 41 are not corresponding will be absorbed by either the operator 56 or the breaker actuator bracket 51 rather than the relatively weak operating handle 41.

Occasionally, operating handle 41 may be subjected to added strains should the manufacturing tolerances of the cover 12 and the components mounted thereon accumulate in an unfavorable manner. To alleviate this condition the operator 56 may be replaced by operator 60 as seen in Figures 6 and 6a. Operator 60 provides an opening 61 to receive projection 48 and an opening 62 within which resilient member 63 is positioned. Operating handle 41 is nested within resilient member 63 whose strength is sufficient to overcome the forces required to operate circuit breaker 40 to its On and Off positions but which will yield should the operating handle 41 be subjected to forces greater than those required for operation of the circuit breaker 40.

While projection 48 cooperates with breaker actuator bracket 51 and operator 56 to prevent closing of cover 12 while breaker 40 is closed projection 48 is located too far from hinges 13 to prevent a partial projection of conducting fingers 21 from case 11 to possibly engage bus bars 22. To prevent any projection of conducting fingers 21 beyond the confines of case 11 while breaker 40 is On, projecting member 70 and blocking member 72 are provided.

Projecting member 70 is secured to the inside of cover 12, reasonably close to hinges 13 and is operatively positioned to be received by slot 71 of blocking member 72 when the circuit breaker 40 is Off. When the circuit breaker 40 is On and the cover is moved from an open position (phantom position of Figure 1) to a closed position the blocking member 72, which is pivotally secured to operator 56 by pin 73, will be positioned to the right so that tip 74 of projecting member 70 will strike end portion 75 of blocking member 72 thus preventing the conducting fingers 21 from being projected far enough to engage the bus bars 22. The end portion 75 of blocking member 72 is slidable through opening 76 of clip 97 which is secured to the inside of case 11 to journal the movement of blocking member 72. In this manner the blocking 72 and projecting 70 members cooperate to force the operator to but breaker 40 in the Off position in order to be able to close cover 12.

With the circuit breaker 40 in the Off position and the cover 12 closed, if the control handle 44 is moved to the On position operator 56 will be rotated clockwise moving end portion 75 into clearance notch 77 of projecting member 70. With blocking member 72 nesting in clearance notch 77, cover 12 is interlocked against opening while breaker 40 is On. This function is also performed by the cooperation of projection 48 and the narrow slot section 54 of breaker actuator bracket 51.

Thus blocking member 72 and projecting member 70 cooperate to form an interlock which prevents the cover 12 from operating the conducting fingers 21 into or out of engagement with bus bars 22 while load switch 40 is On. By repositioning projection 48 closer to hinges 13 and/or increasing the length of projection 48 it is possible to have projection 48 and breaker actuator bracket 51 perform the interlock function of members 70 and 72.

It is to be understood that this invention may be carried out equally well with contact structures merely biased into engagement with the cover operating mechanism or, as illustrated, with contact structures that are mechanically connected to the cover, at all times as are illustrated in copending application Serial No. 637,575 filed January 13, 1957.

Although I have described my invention only in connection with preferred embodiments thereof, many variations and modifications of the principles of my invention within the scope of the description herein are obvious. Accordingly, I prefer to be bound not by the specific disclosure herein but only by the appending claims.

I claim:

1. A plug-in unit for a bus duct comprising a case, a conducting finger, a pair of cooperating contacts, a control handle; said case including a cover and an opening; said cover being operatively connected to said conducting finger to thereby position said conducting finger within the confines of said case when said cover is in an opened position and to project said conducting finger through said opening when said cover is in a closed position; said control handle being operatively connected to said cooperating contacts when said cover is closed; said cooperating contacts being disposed within said case; said control handle being mounted on the outside of said cover and being movable between a first position wherein said cooperating contacts are engaged and a second position wherein said cooperating contacts are disengaged; a means to prevent said cover from opening when said cooperating contacts are engaged; said means comprising a first member and a second member; said first member being secured to the inside of said cover; said second member being operatively connected to said cooperating contacts; said second member being operatively positioned to block movement of said first member when said cover is closed and said cooperating contacts are engaged and to permit movement of said first member when said cooperating contacts are disengaged.

2. A plug-in unit for a bus duct comprising a case, a conducting finger, a pair of cooperating contacts, a control handle; said case including a cover and an opening; said cover being operatively connected to said conducting finger to thereby position said conducting finger within the confines of said case when said cover is in an opened position and to project said conducting finger through said opening when said cover is in a closed position; said control handle being operatively connected to said cooperating contacts when said cover is closed; said cooperating contacts being disposed within said case; said control handle being mounted to said cover and being movable between a first position wherein said cooperating contacts are engaged and a second position wherein said cooperating contacts are disengaged; a means to prevent said conducting finger from being fully projected through said opening by moving said cover from said opened toward said closed position while said cooperating contacts are engaged; said means being comprised of a projecting member and a blocking member; said projecting member being secured to said cover and including a tip; said blocking member being operatively connected to said cooperating contacts; said blocking member being in a first position when said cooperating contacts are engaged and being in a second position when said cooperating contacts are disengaged; said blocking member first position being in the path of said tip when said cover is being moved from said open toward said closed position.

3. A plug-in unit for a bus duct comprising a case, a conducting finger, a pair of cooperating contacts, a control handle; said case including a cover and an opening; said cover being operatively connected to said conducting finger to thereby position said conducting finger within the confines of said case when said cover is in an opened position and to project said conducting fingers through said opening when said cover is in a closed position; said control handle being operatively connected to said cooperating contacts when said cover is closed; said cooperating contacts being disposed within said case; said control handle being mounted on the outside of said cover and being movable between a first position wherein said cooperating contacts are engaged and a second position wherein said cooperating contacts are disengaged; a means to prevent closing of said cover unless said control handle is in said second position; said means being comprised of a first member and a projection; said projection being mounted on the inside of said cover and being operatively connected to said control handle; said first member being rigidly mounted within said case; said first member including a slot having a first slot section and a second slot section larger in width than said first slot section; said projection including a body having a reduced section; said second slot section being positioned to receive said body when said cover is moved from said open to said closed positions and said control handle is in said second position; said first slot section being larger than said reduced section and smaller than said body; said first member being operatively positioned to block said body when said cover is moved from said open toward said closed position and said control handle is between said first and second positions and when said handle is in said second position.

4. A plug-in unit for a bus duct comprising a case, a conducting finger, a pair of cooperating contacts, a control handle; said case including a cover and an opening; said cover being operatively connected to said conducting finger to thereby position said conducting finger within the confines of said case when said cover is in an opened position and to project said conducting finger through said opening when said cover is in a closed position; said control handle being operatively connected to said cooperating contacts when said cover is closed;

said cooperating contacts being disposed within said case; said control handle being mounted on the outside of said cover and being movable between a first position wherein said cooperating contacts are engaged and a second position wherein said cooperating contacts are disengaged; a projection positioned inside of said cover and being operatively connected to said control handle to move in unison therewith, a member rigidly secured within said case; said member including a two width slot having a first width and a second width greater than said first width; an operator mounted on said member and being operatively connected to said cooperating contacts; said operator having an opening in alignment with said two width slot; said operator opening adapted to receive said projection; said projection including a body having a reduced section; said second slot section being positioned to receive said body when said cover is moved from said open to said closed positions and said control handle is in said second position; said first slot section being larger than said reduced section and smaller than said body; said member being operatively positioned to block said body when said cover is moved from said open toward said closed position and said control handle is between said first and second positions and when said handle is in said second position; said body reduced section being positioned within said first width when said cover is closed and said control handle is in said first position.

5. A plug-in unit for a bus duct comprising a case, a conducting finger, a pair of cooperating contacts, a control handle; said case including a cover and an opening; said cover being operatively connected to said conducting finger to thereby position said conducting finger within the confines of said case when said cover is in an opened position and to project said conducting finger through said opening when said cover is in a closed position; said control handle being operatively connected to said cooperating contacts when said cover is closed; said cooperating contacts being disposed within said case; said control handle being mounted on the outside of said cover and being movable between a first position wherein said cooperating contacts are engaged and a second position wherein said cooperating contacts are disengaged; a projection positioned inside of said cover and being operatively connected to said control handle to move in unison therewith; a member rigidly secured within said case; said member including a two width slot having a first width and a second width greater than said first width; an operator mounted on said member; a resilient member secured to said operator and being operatively connected to said cooperating contacts; said operator having an opening in alignment with said two width slot; said operator opening adapted to receive said projection; said projection including a body having a reduced section; said second slot section being positioned to receive said body when said cover is moved from said open to said closed positions and said control handle is in said second position; said first slot section being larger than said reduced section and smaller than said body; said first member being operatively positioned to block said body when said cover is moved from said open toward said closed position and said control handle is between said first and second positions and when said handle is in said second position; said body reduced section being positioned within said first width when said cover is closed and said control handle is in said first position.

6. A plug-in unit for a bus duct comprising a case, a conducting finger, a pair of cooperating contacts, a control handle; said case including a cover and an opening; said cover being operatively connected to said conducting finger to thereby position said conducting finger within the confines of said case when said cover is in an opened position and to project said conducting finger through said opening when said cover is in a closed position; said control handle being operatively connected to said cooperating contacts when said cover is closed; said cooperating contacts being disposed within said case; said control handle being mounted on the outside of said cover and being movable between a first position wherein said cooperating contacts are engaged and a second position wherein said cooperating contacts are disengaged; a projection position inside of said cover and being operatively connected to said control handle to move in unison therewith; a member rigidly secured within said case; said member including a two width slot having a first width and a second width greater than said first width; an operator mounted on said member and being operatively connected to said cooperating contacts; said operator having an opening in alignment with said two width slot; said operator opening adapted to receive said projection; said projection including a body having a reduced section; said second slot section being positioned to receive said body when said cover is moved from said open to said closed positions and said control handle is in said second position; said first slot section being larger than said reduced section and smaller than said body; said member being operatively positioned to block said body when said cover is moved from said closed toward said open position and said control handle is between said first and second positions and when said handle is in said first position; said body reduced section being positioned within said first width when said cover is closed and said control handle is in said first position; a means to prevent said conducting finger from being fully projected through said opening by moving said cover from said opened toward said closed position while said cooperating contacts are engaged; said means being comprised of a projecting member and a blocking member; said projecting member being secured to the inside of said cover and including a tip; said blocking member being operatively connected to said operator; said blocking member being in a first position when said cooperating contacts are engaged and being in a second position when said cooperating contacts are disengaged; said blocking member first position being in the path of said tip when said cover is being moved from said open toward said closed position.

7. A plug-in unit for a bus duct comprising a case, a conducting finger, a pair of cooperating contacts, a control handle; said case including a cover and an opening; said cover being operatively connected to said conducting finger to thereby position said conducting finger within the confines of said case when said cover is in an opened position and to project said conducting finger through said opening when said cover is in a closed position; said control handle being operatively connected to said cooperating contacts when said cover is closed; said cooperating contacts being disposed within said case; said control handle being mounted on the outside of said cover and being movable between a first position wherein said cooperating contacts are engaged and a second position wherein said cooperating contacts are disengaged; interlock means operatively connected to said cooperating contacts to prevent said conducting fingers from being moved into or out of said case unless said control handle is in said second position and said cooperating contacts are disengaged; said interlock means including a blocking member movable to a first position when said cooperating contacts are engaged and to a second position when said cooperating contacts are disengaged.

8. The combination of a case and a circuit interrupter mounted therein; said circuit interrupter including an operating handle and a pair of cooperating contacts operatively connected thereto; said case including a cover; a control handle mounted on the outside of said cover and operable from a first to a second position; a projection mounted on the inside of said cover and operatively connected to said control handle; a member rigidly secured within said case; an operator being pivotally mounted to said member; said operator including a first opening wherein said operating handle is positioned; said operator including a second opening adapted to receive said projection; said member including a slot having a first slot section and a second slot section wider than said first slot section; said projection including a body having a reduced section intermediated the length thereof; said body being larger than said first slot section and smaller than said second slot section; said reduced section being positioned within said second slot section when said cover is closed and said control handle is in said first position and being positioned within said first slot section when said cover is closed and said control handle is between said first and second positions and in said second position; said cooperating contacts being engaged when said cover is closed and said control handle is in said second position; said cooperating contacts being disengaged when said cover is closed and said control handle is in said first posititon.

9. The combination of a case and a circuit interrupter mounted therein; said circuit interrupter including an operating handle and a pair of cooperating contacts operatively connected thereto; said case including a cover; a control handle mounted on the outside of said cover and operable from a first to a second position; a projection mounted on the inside of said cover and operatively connected to said control handle; a member rigidly secured within said case; an operator mounted to said member; said operator including a second opening adapted to receive said projection; said member including a slot having a first slot section and a second slot section wider than said first slot section; said projection including a body having a reduced section intermediated the length thereof; said body being larger than said first slot section and smaller than said second slot section; said reduced section being positioned within said second slot section when said cover is closed and said control handle is in said first position and being positioned within said first slot section when said cover is closed and said control handle is between said first and second positions and in said second position; said operator being positioned between said member and said cover; said cooperating contacts being engaged when said cover is closed and said control handle is in said second position; said cooperating contacts being disengaged when said cover is closed and said control handle is in said first position; a resilient member in operative engagement with said operating handle to compensate for manufacturing tolerances and thereby prevent breakage of said operating handle.

10. A plug-in unit for a bus duct comprising a case, a conducting finger, a load switch, a control handle; said load switch being secured within said case; said load switch including a pair of cooperating contacts and an operating handle operatively connected thereto; said case including a cover and an opening; said cover being operatively connected to said conducting finger to thereby position said conducting finger within the confines of said case when said cover is in an opened position and to project said conducting fingers through said opening when said cover is in a closed position; said control handle being mounted on the outside of said cover and being rotatable between a first position wherein said cooperating contacts are engaged and a second position wherein said cooperating contacts are disengaged; a projection positioned on the inside of said cover and secured to said control handle to move in unison therewith; a member disposed within said case and rigidly secured thereto; said member including a slot having a first slot section and a second slot section of greater width than said first slot section; an operator pivotally mounted on said member and in engagement with said operating handle; said operator having an opening in alignment with said two width slot; said operator opening adapted to receive said projection; said projection including a body having a reduced section; said second slot section being positioned to receive said body when said cover is moved from said open to said closed positions and said control handle is in said second position; said first slot section being larger than said reduced section and smaller than said body; said member being operatively positioned to block said body when said cover is moved from said closed toward said open position and said control handle is between said first and second positions and when said control handle is in said second position; said body reduced section being positioned within said first slot section when said cover is closed and said control handle is in said first position; a fixed member secured to the inside of said case and having a guide slot; a blocking member pivotally mounted at one end to said operator and the other end of which is positioned within said guide slot to be slidable therein; said blocking member being in a first position when said cooperating contacts are engaged and being in a second position when said cooperating contacts are disengaged; said blocking member first position being in the path of said tip when said cover is being moved from said open toward said closed position.

11. The combination of a case and a circuit interrupter mounted therein; said circuit interrupter including an operating handle and a pair of cooperating contacts operatively connected thereto; said case including a cover; a control handle mounted on the outside of said cover and operable from a first to a second position; a projection mounted on the inside of said cover and operatively connected to said control handle; a member rigidly secured within said case; an operator mounted to said member; said operator including a first opening wherein said operating handle is positioned; said operator including a second opening adapted to receive said projection; said member including a slot having a first slot section and a second slot section wider than said first slot section; said projection including a body having a reduced section intermediate the length thereof; said body being larger than said first slot section and smaller than said second slot section; said reduced section being positioned within said second slot section when said cover is closed and said control handle is in said first position and being positioned within said first slot section when said cover is closed and said control handle is between said first and second positions and in said second position; said operator being positioned between said member and said cover; said cooperating contacts being engaged when said cover is closed and said control handle is in said second position; said cooperating contacts being disengaged when said cover is closed and said control handle is in said first position.

12. The combination of a case and a circuit interrupter mounted therein; said circuit interrupter including an operating handle and a pair of cooperating contacts operatively connected thereto; said case including an openable cover; a control handle mounted to said cover and operable from a first to a second position; interlock means including a first rigid member fixedly secured to said case; said interlock means including means carried by said cover, movable by said control handle, and operatively positioned for cooperation with said first rigid member to permit opening and closing of said cover only when said control handle is in said second position and said cooperating contacts are disengaged.

13. The combination of a case and a circuit interrupter mounted therein; said circuit interrupter including an operating handle and a pair of cooperating contacts operatively connected thereto; said case including an openable cover; a control handle mounted to said cover and operable from a first to a second position; interlock means including a first rigid member fixedly secured to said case to permit opening and closing of said cover only when said control handle is in said second position and said cooperating contacts are disengaged; said interlock means also including a second rigid member rigidly secured to said control handle to move in unison therewith; said first rigid member having a first opening positioned to receive said second rigid member only when said control handle is in said second position.

14. The combination of a case and a circuit interrupter mounted therein; said circuit interrupter including an operating handle and a pair of cooperating contacts operatively connected thereto; said case including an openable cover; a control handle mounted to said cover and operable from a first to a second position; interlock means including a first rigid member fixedly secured to said case to permit opening and closing of said cover only when said control handle is in said second position and said cooperating contacts are disengaged; said interlock means also including an operator and a second rigid member rigidly secured to said control handle to move in unison therewith; said first rigid member having a first opening positioned to receive said second rigid member only when said control handle is in said second position; said first rigid member also having a second opening communicating with said first opening; said second opening being too small in size to receive said second rigid member when said cover is moved toward a closed position; said second rigid member including a reduced section entered into said second opening when said handle has operated said contacts into engagement; said reduced section being operatively positioned within said second opening when said handle has operated said contacts into engagement to prevent opening of said cover at this time.

References Cited in the file of this patent

UNITED STATES PATENTS

| | | |
|---|---|---|
| 2,512,505 | Rowe | June 20, 1950 |
| 2,674,666 | Stieglitz | Apr. 6, 1954 |
| 2,695,934 | Wills | Nov. 30, 1954 |
| 2,786,908 | Constantine et al. | Mar. 26, 1957 |
| 2,806,098 | Portman et al. | Sept. 10, 1957 |